US010874099B2

(12) United States Patent
Unger et al.

(10) Patent No.: US 10,874,099 B2
(45) Date of Patent: Dec. 29, 2020

(54) SABADILLA ALKALOID EMULSIFIABLE CONCENTRATE

(71) Applicant: McLaughlin Gormley King Company, Golden Valley, MN (US)

(72) Inventors: Darrick David Unger, Minnetoka, MN (US); Robert A. Suranyi, Minneapolis, MN (US)

(73) Assignee: McLaughlin Gormley King Company, Minneapolis, MN (US)

( * ) Notice: Subject to any disclaimer, the term of this patent is extended or adjusted under 35 U.S.C. 154(b) by 190 days.

(21) Appl. No.: 16/227,049

(22) Filed: Dec. 20, 2018

(65) Prior Publication Data
US 2019/0191696 A1 Jun. 27, 2019

Related U.S. Application Data

(60) Provisional application No. 62/610,783, filed on Dec. 27, 2017.

(51) Int. Cl.
| *A61K 36/00* | (2006.01) |
| *A01N 25/04* | (2006.01) |
| *A01N 43/90* | (2006.01) |
| *A01N 65/40* | (2009.01) |

(52) U.S. Cl.
CPC ............ *A01N 25/04* (2013.01); *A01N 43/90* (2013.01); *A01N 65/40* (2013.01)

(58) Field of Classification Search
CPC ....................................................... A61K 36/00
USPC ........................................................... 424/725
See application file for complete search history.

(56) References Cited

U.S. PATENT DOCUMENTS

| 3,078,211 A | 2/1963 | Allison |
| 4,388,297 A | 6/1983 | Naffziger |
| 6,593,299 B1 | 7/2003 | Bennett et al. |

FOREIGN PATENT DOCUMENTS

| WO | 2009126577 A2 | 10/2009 |
| WO | 2017027836 A1 | 2/2017 |
| WO | 2017070451 A1 | 4/2017 |

OTHER PUBLICATIONS

International Search Report and Written Opinion dated May 3, 2019.

*Primary Examiner* — Michael V Meller
(74) *Attorney, Agent, or Firm* — Wood, Phillips, Katz, Clark & Mortimer

(57) ABSTRACT

The invention relates to sabadilla alkaloid emulsifiable concentrate compositions. The present invention further relates to methods of controlling pests by application of sabadilla alkaloid emulsifiable concentrate compositions.

1 Claim, No Drawings

SABADILLA ALKALOID EMULSIFIABLE CONCENTRATE

FIELD OF THE INVENTION

The present invention is directed to sabadilla alkaloid emulsifiable concentrate compositions. The present invention is further directed to methods of controlling pests by application of sabadilla alkaloid emulsifiable concentrate compositions.

BACKGROUND OF THE INVENTION

Controlling damaging pests on plants grown to provide human food is a constant struggle for growers. Insects can completely destroy a harvest and can cause catastrophic food shortages or financial ruin for the growers. Although many products are effective against insects and mites that damage plants, the products must also be safe enough to be released into the growing environment and safe enough to be applied to parts of the plants that will eventually be consumed.

Organic farming is increasing in popularity. Organic farming restricts the use of compounds that are used for pest control to encourage sustainability and safety. Insecticides can be used in organic farming if they are considered "natural." Unfortunately, many of the natural insecticides currently available are not potent enough to provide adequate insect control. Further, many of the currently available natural insecticides are not practical to apply or their application is cost prohibitive.

One effective naturally derived insecticide is found in the tissues of many of the plants of the genus *Schoenocaulon*. The species with the longest history of use, and the most readily available, is the Sabadilla Lily (*Schoenocaulon officinale*). The plant is indigenous to Central and South America and its seeds have been used for centuries for their insecticidal properties. The seeds contain the alkaloids veratridine and cevadine, both of which are known to be active against arthropods.

Usually the dried seeds are ground to a powder and the powder is applied dry or wetted to the insects. The dust from the seeds, however, can cause eye and nasal irritation.

U.S. Pat. Nos. 2,348,949 and 2,390,911 disclose the use of ground sabadilla seeds with beta-butoxy-beta-prime-thiocyanodiethyl-ether to control house flies. Further, these patents teach heating the seeds and using them as a powder or mixing them with kerosene to form a sprayable formulation. Neither of these disclosed mixtures of ground sabadilla seeds would be appropriate for organic farming.

Further, insect infestation of human living spaces is a persistent problem. Bed bugs (*Cimex lectularius*) are difficult to detect because they are small and often emerge from their hiding spots at night. Currently, there are limited means of capturing and containing bed bugs. Often, an insecticide is the only way to thoroughly treat an environment. Unfortunately, current insecticides are inadequate to provide the mortality rates necessary to completely eliminate an infestation. Another issue that has emerged is that some colonies have developed very high resistance to pyrethroid treatments and neonicotinoid resistance. The Environmental Protection Agency ("EPA") has determined that pyrethroid-resistant colonies pose a significant human health risk.

Accordingly, there is a need for new sabadilla alkaloid emulsifiable concentrate compositions and methods of controlling pests on plants and in human living spaces. The methods should be potent, safe to apply, and safe for the environment.

SUMMARY OF THE INVENTION

In one aspect, the present invention is directed to sabadilla alkaloid emulsifiable concentrate compositions containing sabadilla alkaloids, a surfactant and one or more solvents.

In another aspect, the present invention is directed to methods of controlling pests comprising applying an effective amount of sabadilla alkaloid emulsifiable concentrate compositions.

DETAILED DESCRIPTION OF THE INVENTION

Applicant has unexpectedly developed a new sabadilla alkaloid emulsifiable concentrate composition containing sabadilla alkaloids, a surfactant and one or more solvents.

Sabadilla alkaloids may be derived from any species of *Schoenocaulon*. The genus *Schoenocaulon* includes the following species: *S. calcicola*, *S. caricifolium*, *S. comatum*, *S. conzattii*, *S. dubium* (alt. *S. gracile*), *S. framei*, *S. ghiesbreghtii* (alt. *S. drummondii*, *S. yucatanense*), *S. ignigenum*, *S. intermedium*, *S. jaliscense*, *S. macrocarpum* (alt. *S. lauricola*), *S. madidorum*, *S. megarrhizum*, *S. mortonii*, *S. oaxacense*, *S. obtusum*, *S. officinale*, *S. pellucidum*, *S. plumosum*, *S. pringlei*, *S. rzedowskii*, *S. tenorioi*, *S. tenue*, *S. tenuifolium*, *S. texanum*, and *S. tigrense*. In a preferred embodiment the sabadilla alkaloids are derived from *S. officinale*. In another preferred embodiment the sabadilla alkaloids are veratridine and cevadine.

In one embodiment, the present invention is directed to methods for controlling pests comprising diluting a sabadilla alkaloid emulsifiable concentrate composition of the present invention and applying the diluted composition to pests or to pests' environment.

In another embodiment, the pests controlled are selected from the group consisting of members of the class Insecta (insects) and Arachnida subclass Acari (mites).

In an embodiment, the insects controlled are selected from the group consisting of aphids (Hemiptera), whiteflies (Hemiptera), *thrips* (Thysanoptera), leafhoppers (Hemiptera), bed bugs (Hemiptera), psyllids (Hemiptera), scale insects (Hemiptera), mealybugs (Hemiptera), psocids (Psocoptera), lice (Phthiraptera), fleas (Siphonaptera), caterpillars (Lepidoptera), and early immature stages of beetles (Coleoptera), true bugs (Hemiptera), cockroaches (Blattodea), flies (Diptera) and wasps (Hymenoptera). In a preferred embodiment, the insects controlled are selected from the group consisting of aphids (Hemiptera), whiteflies (Hemiptera), *thrips* (Thysanoptera), leafhoppers (Hemiptera), bed bugs (Hemiptera), psyllids (Hemiptera), scale insects (Hemiptera), mealybugs (Hemiptera), psocids (Psocoptera), lice (Phthiraptera), and fleas (Siphonaptera). In a more preferred embodiment, the insects controlled are selected from the group consisting of bed bugs (*Cimex lectularius*), western flower *thrips* (*Frankliniella occidentalis*), green peach aphids (*Myzus persicae*), and greenhouse whitefly (*Trialeurodes vaporariorum*).

In a preferred embodiment, the mites controlled are two-spotted spider mites (*Tetranychus urticae*).

Sabadilla alkaloid emulsifiable concentrate compositions are a contact pesticide which means that the composition should be applied directly to the pests or their environment for the most effective control. The composition can be diluted and applied with a pressurized system, such as aerosol generators or in a form of ground application, e.g., low pressure boom sprayers, high pressure sprayers, air blast sprayers, low volume air sprayers (mist blowers), hand-operated sprayers and pump sprays. The diluted composition should be applied as a fine spray until the surface is uniformly wet with minimal runoff.

In yet another embodiment, sabadilla alkaloid emulsifiable concentrate compositions can be diluted and applied to an absorbent material and the material can be applied in the vicinity of the area in need of treatment. For example, the diluted composition could be placed on a piece of cloth and the cloth could be positioned in a place where bed bugs are likely to come in contact with the cloth.

In a preferred embodiment, the sabadilla alkaloids are in a 10% extract that may be present in the composition of the invention at a concentration from about 10% to about 60% w/w, more preferably from about 30% to about 50% w/w, yet more preferably from about 40% to about 45% w/w and most preferably at about 42% w/w.

In another preferred embodiment, the surfactant is selected from the group consisting of T-Det® C-series of surfactants (T-Det is a registered trademark and available from Harcros Chemicals Inc.) T-Det® C-series of surfactants are reaction products of castor oil and ethylene oxide and include T-Det® C-20 (reaction product of one mole of castor oil with 20 moles of ethylene oxide) and T-Det® C-40 (reaction product of one mole of castor oil with 40 moles of ethylene oxide). In a most preferred embodiment, the surfactant is the reaction product of one mole of castor oil with 20 moles of ethylene oxide.

The reaction product of castor oil and ethylene oxide may be present in compositions of the present invention at a concentration from about 10% to about 50% w/w, even more preferably from about 20% to about 40% w/w and most preferably about 30% w/w.

In a preferred embodiment, the one or more solvents are selected from the group consisting of water, corn oil, methanol, ethanol, glycol ether, ethyl lactate, propanol, butyl lactate, gamma-butyrolactone and 1-butanol. In an alternative embodiment other vegetable oils, seed oils and nut oils may also be used such as canola oil, olive oil, palm oil, rapeseed oil, sesame oil, soybean oil, peanut oil, sunflower oil, safflower oil, cottonseed oil and grapeseed oil. In a preferred embodiment, the one or more solvents are a mixture of water, butyl lactate and corn oil.

The one or more solvents may be present in the compositions of the invention at a total concentration from about 10% to about 50% w/w, more preferably from about 15% to about 40% w/w and most preferably at about 28% w/w.

In another preferred embodiment, the one or more solvents comprise water at a concentration from about 1% to about 15% w/w, more preferably from about 5% to about 10% w/w and most preferably at about 8% w/w.

In another preferred embodiment, the one or more solvents comprise corn oil at a concentration from about 1% to about 15% w/w, more preferably from about 5% to about 10% w/w and most preferably at about 8% w/w.

In another preferred embodiment, the one or more solvents comprise butyl lactate at a concentration from about 1% to about 20% w/w, more preferably from about 10% to about 15% w/w and most preferably at about 12% w/w.

In a more preferred embodiment, the one or more solvents comprise 8% w/w water, 8% w/w corn oil and 12% w/w butyl lactate.

In yet another embodiment, the emulsifiable concentrate is diluted before application. In a preferred embodiment, the emulsifiable concentrate is diluted by placing from about 0.25 to about 15 ounces of the emulsifiable concentrate per gallon of water to create a homogenous emulsion for application.

As used herein, "pests' environment" refers to any area that the pest is present during any life stage. One environment likely to be treated by the methods of the present invention includes the plants that the pests are living on and the surrounding soil. The pests' environment may include soil, plants, harvested plants, gardens, fields, greenhouses, or other buildings, and various indoor surfaces and structures, such as furniture including beds, and furnishings including books, clothing, etc.

As used herein, all numerical values relating to amounts, weight percentages and the like are defined as "about" or "approximately" each particular value, namely, plus or minus 10% (±10%). For example, the phrase "at least 5% w/w" is to be understood as "at least 4.5% to 5.5% w/w." Therefore, amounts within 10% of the claimed values are encompassed by the scope of the claims.

The articles "a," "an" and "the" are intended to include the plural as well as the singular, unless the context clearly indicates otherwise. For example, the methods of the present invention are directed to controlling "pests", but this can include control of a single pest (such as a single insect).

The following examples are intended to illustrate the present invention and to teach one of ordinary skill in the art how to use the invention. They are not intended to be limiting in any way.

EXAMPLE

An emulsifiable concentrate composition was formulated with the ingredients at the listed concentration of Table 1, below.

TABLE 1

| Ingredient | Concentration (w/w) | Purpose |
|---|---|---|
| 10% Sabadilla Alkaloid Extract | 42% | Active Ingredient |
| Reaction product of one mole of castor oil with 20 moles of ethylene oxide | 30% | Surfactant |
| Butyl lactate | 12% | Solvent |
| Corn oil | 8% | Solvent |
| Water | 8% | Solvent |

We claim:

1. An emulsion consisting of a sabadilla extract, a reaction product of one mole of castor oil and 20 moles of ethylene oxide and a solvent consisting of water, corn oil and butyl lactate.

* * * * *